(12) United States Patent
Pawar et al.

(10) Patent No.: US 8,028,011 B1
(45) Date of Patent: Sep. 27, 2011

(54) GLOBAL UNIX FILE SYSTEM CYLINDER GROUP CACHE

(75) Inventors: Sitaram Pawar, Shrewsbury, MA (US); Jean-Pierre Bono, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 876 days.

(21) Appl. No.: 11/457,177

(22) Filed: Jul. 13, 2006

(51) Int. Cl.
*G06F 17/30* (2006.01)
*G06F 12/00* (2006.01)
(52) U.S. Cl. .................. 707/830; 711/129; 711/118
(58) Field of Classification Search ............... 707/1, 830
See application file for complete search history.

(56) References Cited

U.S. PATENT DOCUMENTS

| | | | | |
|---|---|---|---|---|
| 5,253,351 | A * | 10/1993 | Yamamoto et al. | 711/118 |
| 5,390,318 | A * | 2/1995 | Ramakrishnan et al. | 711/158 |
| 5,403,639 | A * | 4/1995 | Belsan et al. | 707/204 |
| 5,636,356 | A * | 6/1997 | Kakuta et al. | 711/114 |
| 6,397,311 | B1 * | 5/2002 | Capps | 711/165 |
| 6,421,767 | B1 * | 7/2002 | Milillo et al. | 711/162 |
| 6,587,919 | B2 * | 7/2003 | Yanai et al. | 711/112 |
| 2003/0115410 | A1 * | 6/2003 | Shriver | 711/113 |
| 2003/0149683 | A1 * | 8/2003 | Lee et al. | 707/1 |
| 2005/0144517 | A1 * | 6/2005 | Zayas | 714/8 |
| 2007/0150691 | A1 * | 6/2007 | Illendula et al. | 711/170 |

OTHER PUBLICATIONS

"Embedded Linux Experts", 1998, Linux/fs/ufs.*

* cited by examiner

*Primary Examiner* — Pierre Vital
*Assistant Examiner* — Sabana Rahman
(74) *Attorney, Agent, or Firm* — Krishnendu Gupta; Joseph D'Angelo (57) ABSTRACT

A global cylinder group (CG) cache is stored in file server memory and shared by a plurality of file systems supported by the file server. The global CG cache comprises a number CG entries which are pre-allocated in memory. As different file systems are accessed, global CG entries in the CG cache are used to store CG block information for the accesses. With such an arrangement, a file server may support multiple file systems using a single global CG cache without starvation and other the adverse performance impacts of the prior art. According to one aspect of the invention, the global CG cache is periodically scanned to reclaim memory. In contrast to the prior art, where multiple scans were periodically performed of multiple CG caches for memory reclamation, the use of a single CG cache minimizes the impact of CG cache maintenance on file server performance.

20 Claims, 10 Drawing Sheets

Cache CG Entry

GLOBAL UNIX FILE SYSTEM CYLINDER GROUP CACHE

FIELD OF THE INVENTION

This invention relates generally to the field of file systems and more particularly to caching cylinder group information.

BACKGROUND OF THE INVENTION

Figure 1:
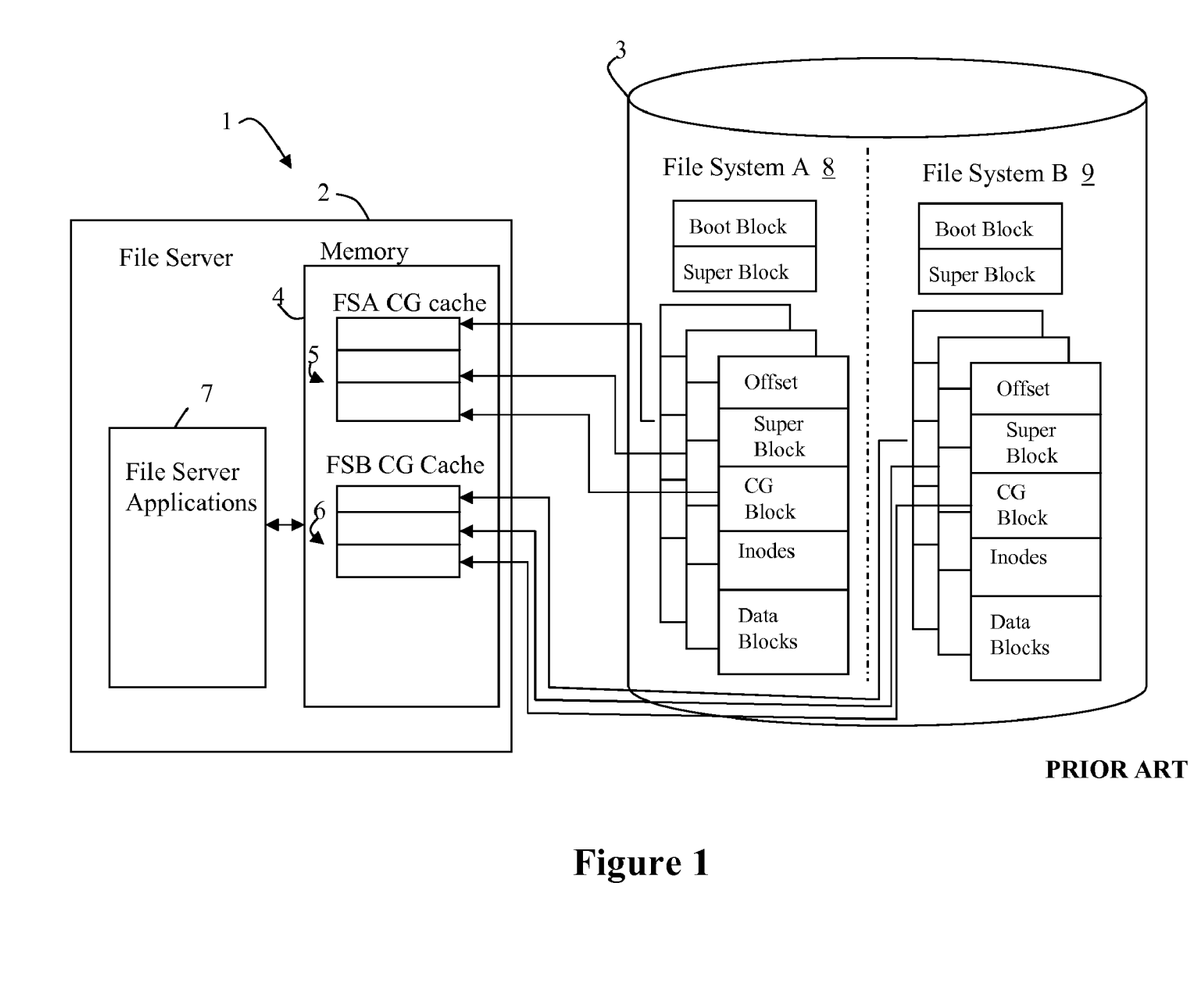
FIG. 1 is a block diagram of a storage system that utilizes a prior art UNIX file system (UFS) cylinder cache arrangement.

FIG. 1 illustrates several components that may be included in a typical UNIX file system (UFS). Available space of a disk storage system 3 is generally shared by one or more file systems such as file system A (8) and file system B (9). File systems define the use of data storage devices that offer access to an array of fixed-size blocks, or sectors. The file system software is responsible for organizing these sectors into files and directories, and keeping track of which sectors belong to which file and which are not being used.

A UNIX file system (UFS) is a file system used by many UNIX and Unix-like operating systems. Each Unix file system is composed of a group of boot blocks, a superblock and a collection of cylinder groups (CGs). The boot block stores code which is used to initialize the file system. The superblock stores statistical, geometric and behavioral tuning parameters associated with the file system. Each cylinder group (CG) has the following components: a backup copy of the superblock a CG block which stores information to the particular cylinder, a collection of inode data structures that store metadata associated with the cylinder group data blocks, and the cylinder group data blocks. Each CG block entry includes a first portion characterizing the state of the associated cylinder, and a second portion including the cylinder group header of the associated cylinder. The state of the associated cylinder may include a cylinder group number, the block number within the cylinder where the cylinder block resides, state and other cylinder group counters. The cylinder group block stores attribute and inode information for the cylinder, and will generally vary in size from one file system to another based on the inode density of the cylinder group.

A file server such as file server 2 accesses storage devices associated with the file systems. File servers generally includes a memory 4, a portion of which is allocated to the temporary storage of data retrieved from the disk device to increase application performance by the reducing delays associated with I/O disk access. To support a typical UFS file system, the file server allocates a portion of memory to each file system to store a cylinder group cache (CG cache 5,6) for the file system. Each CG cache entry stores an in memory representation of each cylinder block for the associated file system. For example, in FIG. 1 the memory includes FSA CG cache 5 for storing CG block for file system A, and FS CG cache 6 for storing CG blocks for file system B. A CG cache is assembled in memory when each UFS is first mounted, and remains in memory until the associated file system is unmounted.

Storing the CG block in memory as described above allows the file server to more quickly retrieve cylinder information, resulting in faster allocation of and access to data blocks. However, as file systems are mounted and storage for the associated CG caches is reserved in memory, memory can quickly become full. Larger file systems, having concomitantly larger CG caches, will receive a larger allocation of memory, effectively starving out other file systems and reducing the performance of the file server.

One technique that is used to reclaim memory to reduce starvation involves searching the CG block entries of each individual CG cache to determine which CGs are least recently accessed. The cylinder block information associated with the LRU cylinder can be deleted, allowing at least a portion of the memory to be reclaimed for use by other file systems. Generally the file systems control the scanning of the CG caches during a synch period allocated to each file system. CG entries which are determined to be 'aged' during the synch period are deleted from memory. While this reclaiming scheme helps to reduce the impact that larger file systems have on file server resources, in heavily loaded storage systems the reclamation may not be sufficient to eliminate memory starvation. In addition, the frequent scanning of CG caches by multiple file systems in the reclaiming scheme reduces the performance of the file server. It would be desirable to identify a CG caching scheme that would overcome the problems of the prior art.

SUMMARY OF THE INVENTION

According to one aspect of the invention, a global cylinder group (CG) cache is stored in a memory of a file server and shared by a plurality of file systems supported by the file server. The global CG cache comprises a number CG entries which are pre-allocated in memory. As different file systems are accessed, global CG entries in the CG cache are used to store CG block information for the accesses. Thus space in the global CG cache is reserved only for CG blocks associated with recently accessed, or 'active' file system cylinders. The global CG cache is indexed using a combination of a file system identifier and cylinder group number. With such an arrangement, a file server may support multiple file systems using a single global CG cache without starvation and other the adverse performance impacts of the prior art. According to one aspect of the invention, the global CG cache is periodically scanned to reclaim memory. In contrast to the prior art, where multiple scans were periodically performed of multiple CG caches for memory reclamation, the use of a single CG cache minimizes the impact of CG cache maintenance on file server performance.

DETAILED DESCRIPTION

Figure 2:
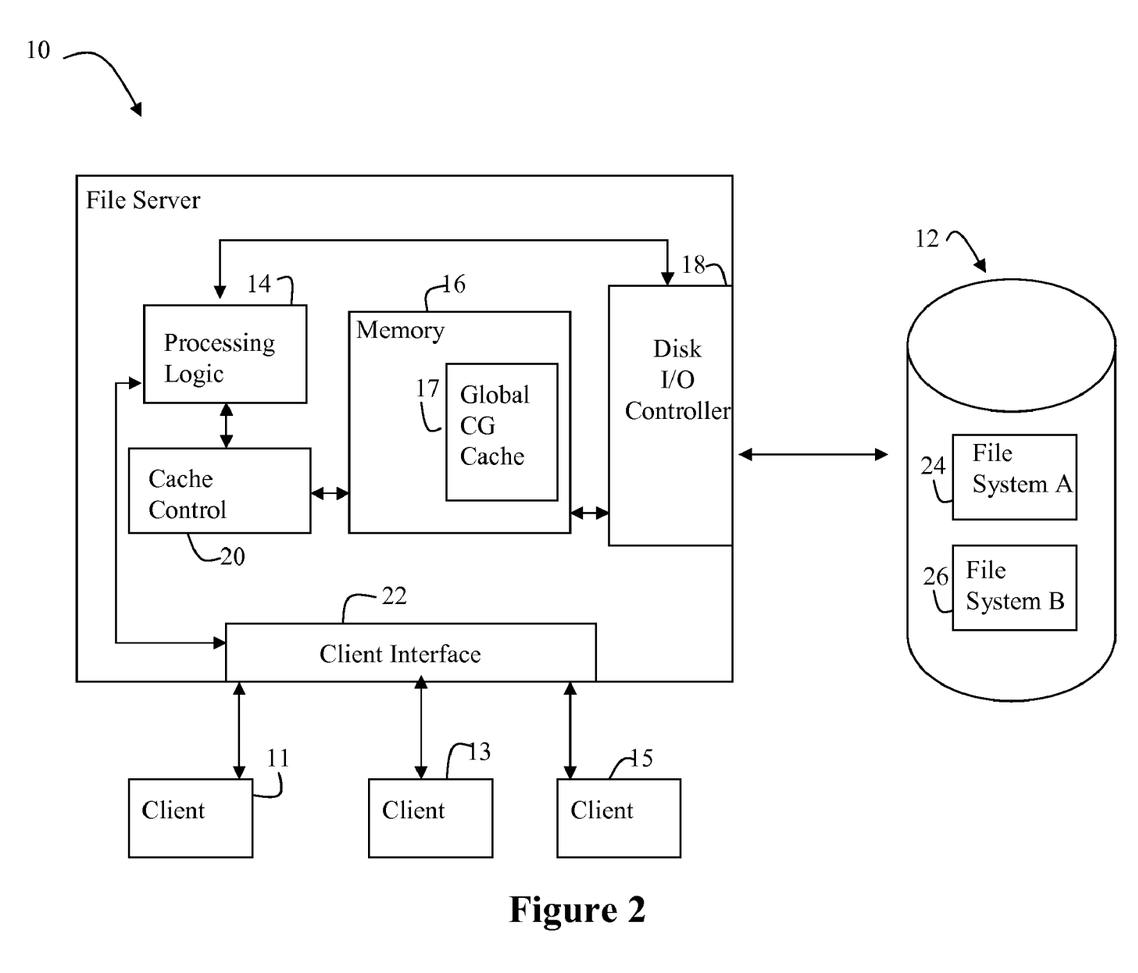
FIG. 2 is a block diagram of a storage system that may include a file server including a global cylinder cache of the present invention.

Referring now to FIG. 2, a file server 10 of the present invention is device that includes hardware and software components that are used to control the access to file systems 24 and 26 by file server applications. The file server applications may operate to control access to storage of data for clients such as clients 11, 13 and 15. The file server 10 may include a client interface for communicating with the clients, where the interface may be a Local Area Network (LAN) or Wide Area Network (WAN) interface. For example, where storage 12 is a Network Attached Storage (NAS) device, the client interface may be an Internet Protocol (IP) interface.

The file server also includes a disk interface 18 for communicating with storage 12. According to one aspect of the invention, the file server maintains a global Cylinder Group (CG) cache 17 in memory 16. The global CG cache 17 is a single cache that is simultaneously shared by multiple file systems. Thus global CG cache 17 provides temporary storage of CG information for a plurality of file systems, such as file systems 24 and 26. The CG cache 17 is managed by cache controller 20. According to one aspect of the invention the cache controller allocates memory locations in the CG cache to in a manner that maximizes the amount of active file system information that is stored in the CG cache. Rather than reserve space in the memory to store CG entries that are infrequently accessed, CG entries are allocated to file systems on an as-needed basis. Allocating CG entries of the global CG cache on an as-needed basis allows multiple file systems to be serviced with increased performance. The cache controller 20 may be implemented in software, hardware or a combination thereof. Although the cache controller will be shown and described as having various components for performing various functions, it will be appreciated that the present invention is not limited to the components or structures described herein.

Figure 3:
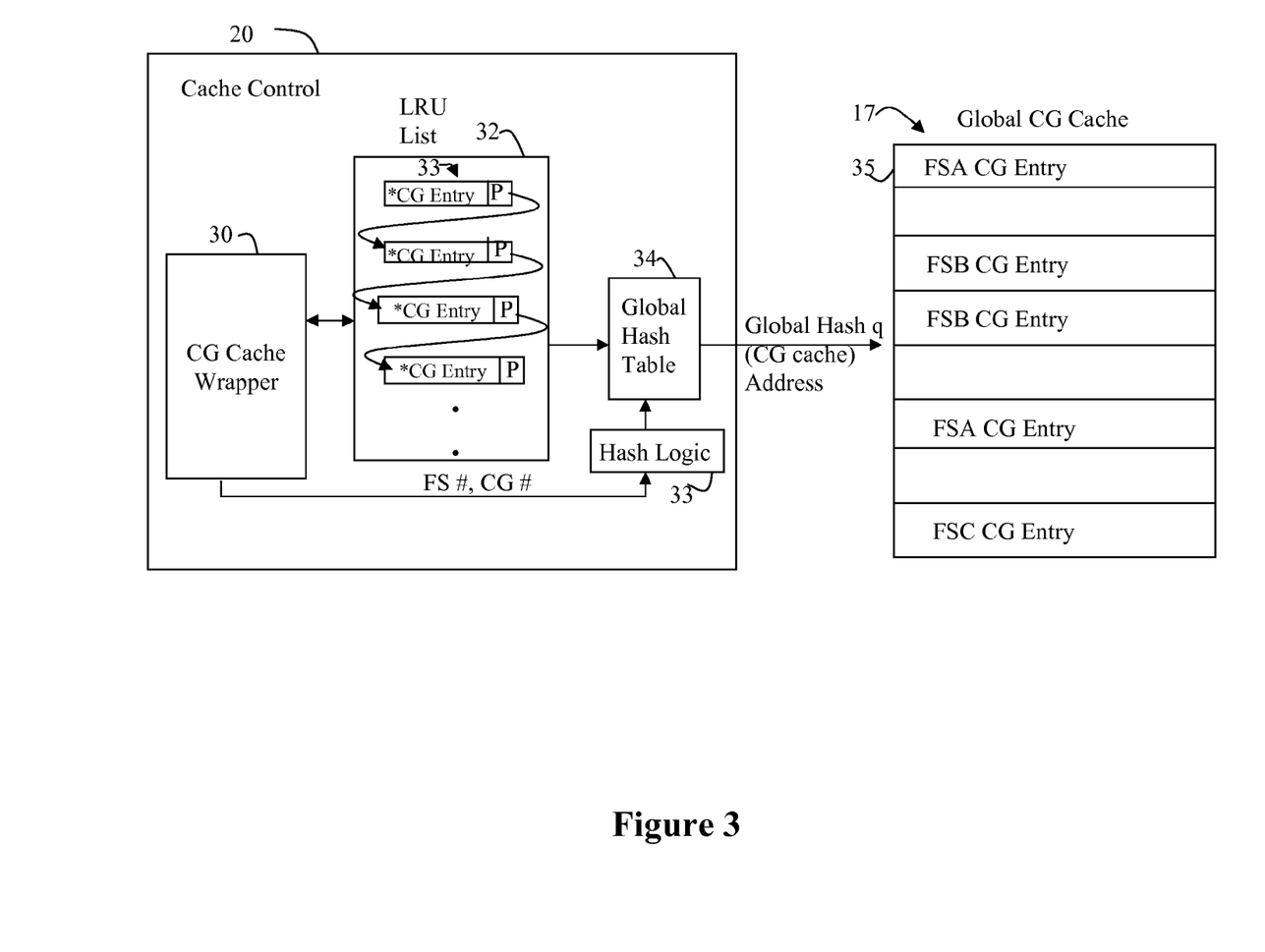
FIG. 3 is a block diagram provided to illustrate one embodiment of a cache controller and global cylinder group cache that may operate according to the principles of the present invention.

FIG. 3 provides a more detailed diagram of the cache controller 17 and global CG cache 12. The cache controller 17 may include a cylinder group (CG) cache wrapper 30, a Least Recently Used (LRU) list 32, a global hash table 34 and hash logic 33. The CG cache wrapper 30 may be implemented as object oriented software, with the cylinder group (CG) entries being represented as objects having associated data structures, although this is not a requirement. The CG wrapper controls the initialization, population and reclamation of entries in the global CG cache.

The CG cache 17 is shown in more detail to include a predetermined number of entries such as entry 35 for storing CG block. The number of entries that are allocated to the CG cache is a matter of design choice, taking into account other demands on file server memory. In one embodiment, blocks which are allocated to the CG cache may be intelligently pre-empted for use by other applications using techniques similar to those described in patent application Ser. No. 11/427,526, entitled "Method and Apparatus for Intelligent Pre-emption of Buffer Cache locations", by Bhayana et al., filed on Jun. 29, 2006 and incorporated herein by reference (referred to herein as the Bhayana application).

In one embodiment the CG cache 17 is advantageously implemented as a Hash Q that is indexed using a hash index. The hash index is generated by hashing the file system identifier and CG number of a file system reference using hash logic 33. The present invention is not limited to the use of any particular hash function, although the hash function should be one that ensures that there are fewer collisions in the hash memory address space for an identified number of file systems and cylinder groups. A hash table 34 maps a memory address of the CG block to the hash index. In this description the term 'global CG cache' and Hash Q may be used interchangeably.

List 32 stores pointers to the memory locations that are pre-allocated for storing CG block entries. The list 32 is advantageously arranged as a linked list in Least Recently Used order and therefore memory locations associated with least recently accessed cylinder block entries are at the top of the list. A list entry may include, for example, a pointer to a cylinder block entry in memory, as well as a pointer to the next LRU cylinder block entry. When the UFS accesses cylinders that are not already cached, a CG entry is allocated to the access. The Hash Q is indexed using a combination of the file system identifier and CG identifier included in the access. With this arrangement, storage for CG entries is only allocated when the CG is originally accessed by the mounted file system. As a result memory is allocated only to accessed, active portions of the file systems, thereby allowing a greater number of file systems to be supported by the file server.

The use of a single global CG cache also increases file server performance because only one CG cache needs to be scanned to quickly identify available memory. Such an arrangement removes the need to perform multiple scans to analyze the different CG caches associated with the different file servers in the prior art. According to one aspect of the invention, available CG entries are identified by tracking the time period since access (referred to herein as 'recency' of access) of the CG using a counter in the CG entry. The counter is initialized each time the cylinder is accessed and decremented during each subsequent synchronization, or 'aging' period. In one implementation, the counter is referred to as a 'dirty' counter and is maintained as part of the CG entry stored in the Hash Q.

Figure 4:
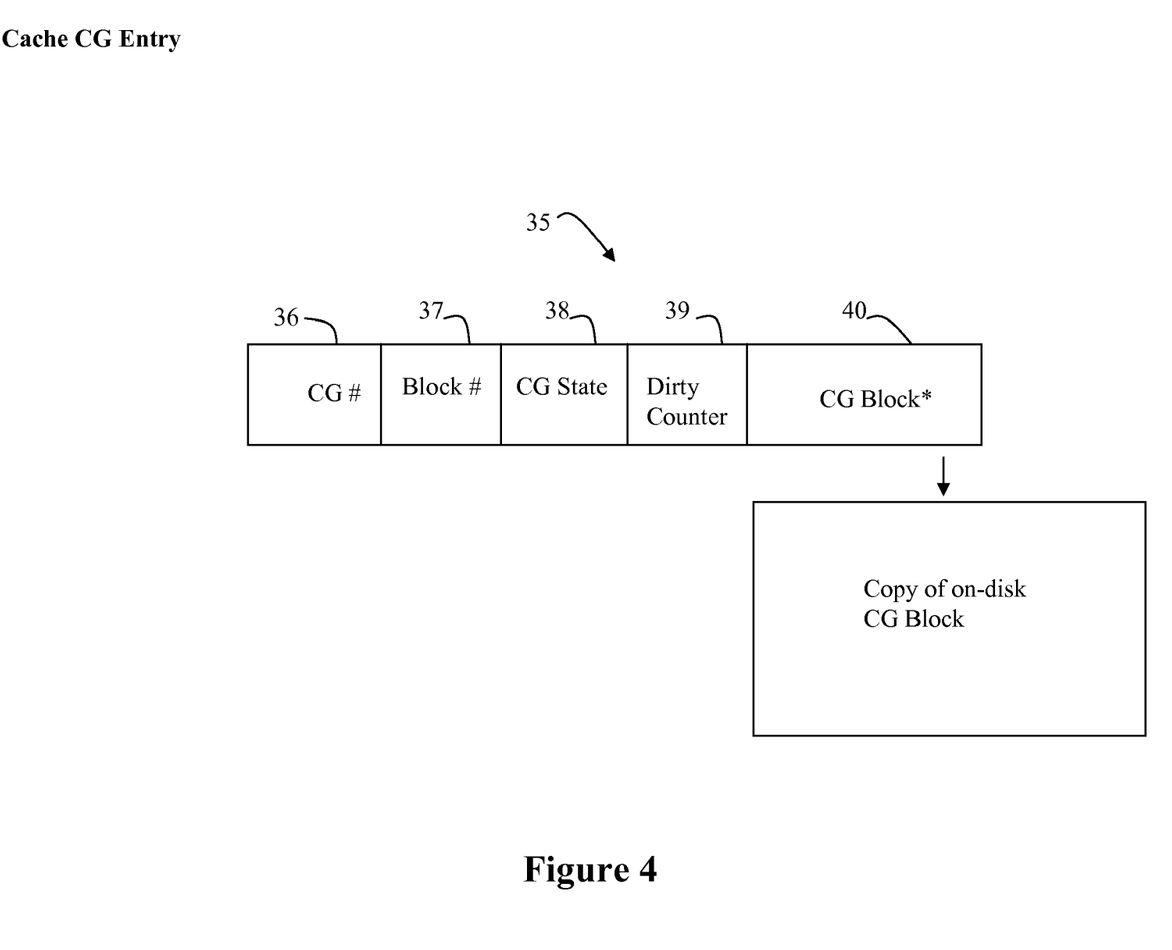
FIG. 4 is a diagram provided to illustrate several fields that may be included in a cylinder group block entry of the present invention.

FIG. 4 illustrates several exemplary fields that may be included in a CG entry 35. The CG entry 35 includes a CG number 36, a block number 37, identifying the on disk block number for the associated CG block, CG state 38 which may identify a state of the CG entry, such as whether the CG entry is free (for allocation) or valid (i.e., storing valid CG data). The CG entry 35 is also shown to include a dirty counter 39 and a CG block 40. The CG block holds the on-disk copy of CG block that describes the current CG state and is generally implemented as an object including free inode and block maps. Other implementations which use a subset of the above fields, or include additional fields, are intended to be equivalents to the illustrated CG entry, and thus the present invention is not limited to the inclusion of specific fields in the CG entry.

The dirty counter 39 is used in the present invention to track CG entry recency of access. The dirty counter is initialized with an integer value when the CG is accessed. At each subsequent synch interval the counter is decremented. In one embodiment, because the dirty counter 39 is used to 'age' the CG entries, it may also be used by the CG wrapper to maintain LRU list order. When the dirty counter is decremented to a pre-determined value, a portion of memory holding CG block can be released by deleting the CG block associated with the CG entry.

FIGS. 5-9 are flow diagrams which illustrate several exemplary steps that may be taken by the CG wrapper or cache controller to populate and maintain the global CG cache of the present invention. It should be understood that the flow diagrams are meant to be illustrative only, and the present invention is not limited to the specific steps shown in the flow diagrams, but rather encompasses any equivalent processes that support the use of a global UFS CG cache.

Figure 5:
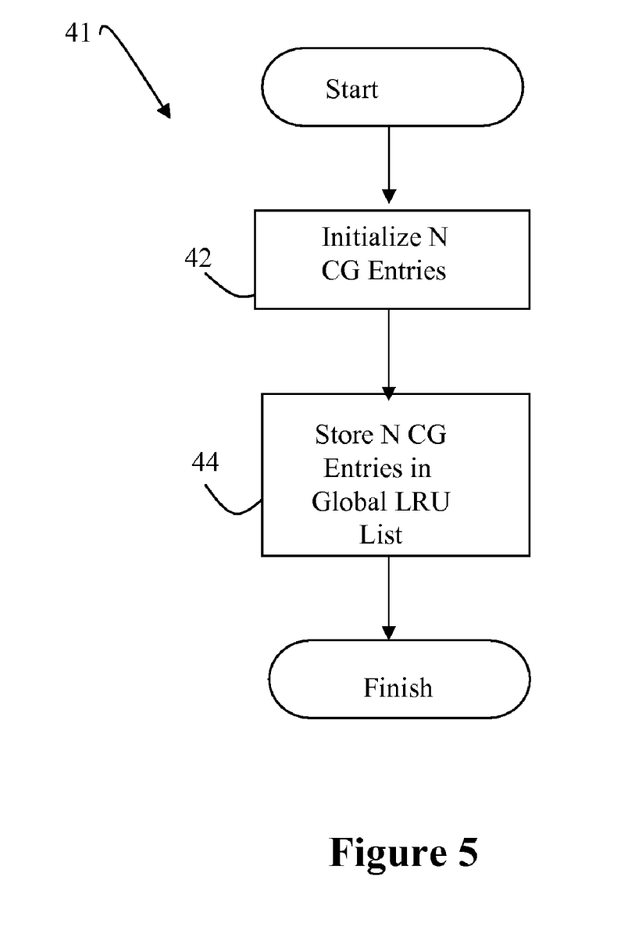
FIG. 5 is a flow diagram provided to illustrate several exemplary steps that may be performed by the cache controller of FIG. 3 to allocate cylinder group block entries and generate a list of cylinder group block entries.

FIG. 5 illustrates steps that may be performed in an exemplary process 40 that initially allocates CG entries in memory to build a global CG cache of the present invention. At step 42 a number N of cache entries is selected by the file server operating system or network administrator. A number of bytes to be reserved for each the CG entries is also determined, and memory addresses of the CG entries for the global CG cache are identified. The selected values are a matter of design choice. At step 44 pointers to the memory addresses of the CG entries in the global CG cache are stored in the list 32, and the list is available for use.

Figure 6:
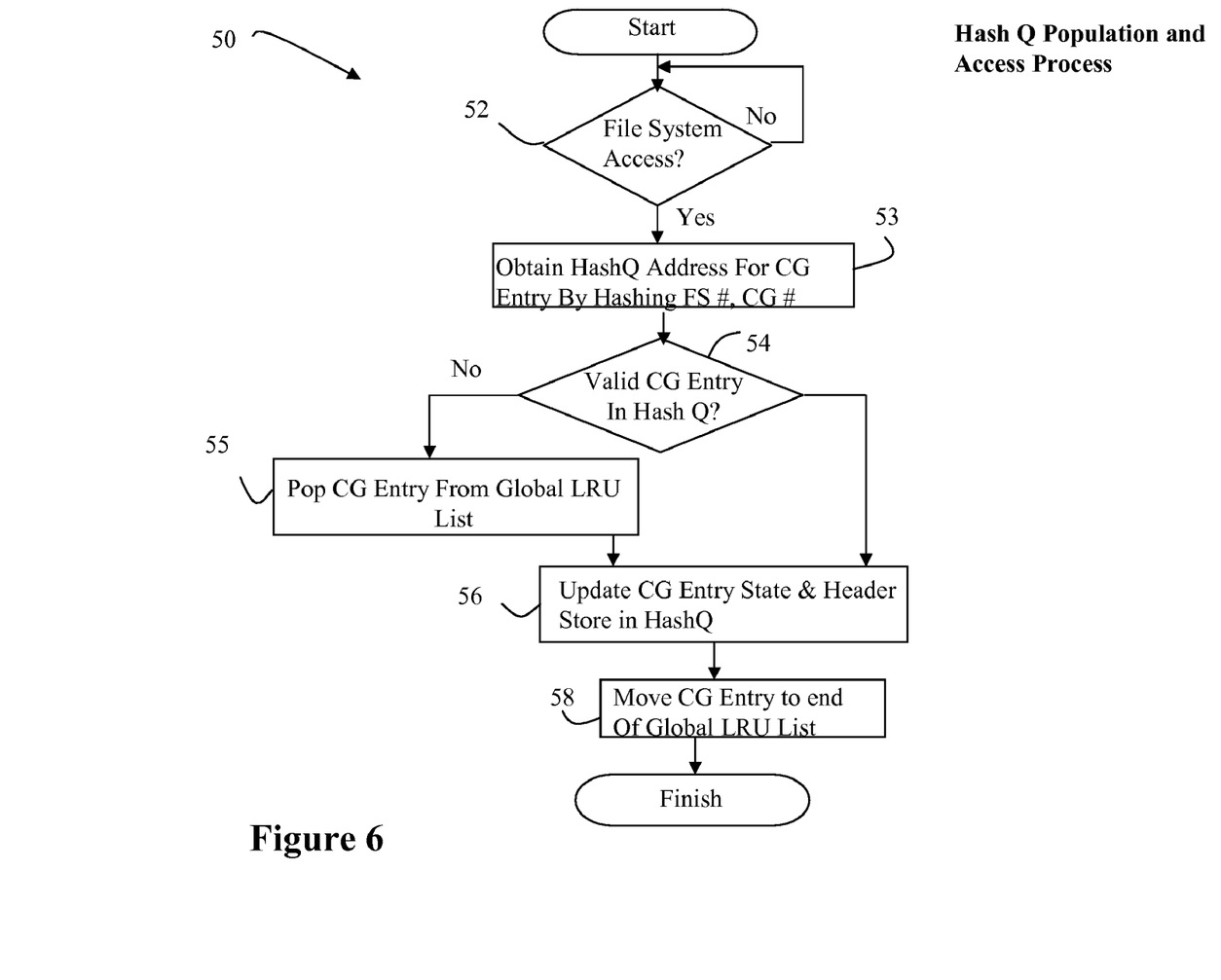
FIG. 6 is a flow diagram which illustrates several steps that may be performed by the cache controller to populate a cylinder group cache of the present invention in response to file server access requests.

FIG. 6 is a flow diagram that illustrates exemplary steps that may be performed by the cache controller or CG wrapper process 50 when accessing the global CG cache. After a file system access is detected at step 52 the process proceeds to step 53 where a hash index is generated using a file system identifier (such as a file system number) and a CG number of the access. At step it is determined whether the CG entry associated with the hash index is a valid CG entry, for example by examining the CG state field 38 of the CG entry. If the CG entry is valid, then the CG block information is already present in the global CG cache. The process continues to step 56, where the CG entry is updated to reflect changes to the CG status that result from the access.

If, however, it was determined at step 54 that the CG entry associated with the hash index is not Valid, then memory has not been allocated for the CG of the file system. At step 55, a CG entry pointer is retrieved from the list 32, and the hash table is updated to map the popped CG entry address to the hash index. At step 56, the CG entry is updated to reflect any changes to the CG that result from the access. At step 58, the CG entry is moved to the end of the LRU list 32, and the dirty counters for the CG block entry is updated to reflect the recent access of the block.

Figure 7:
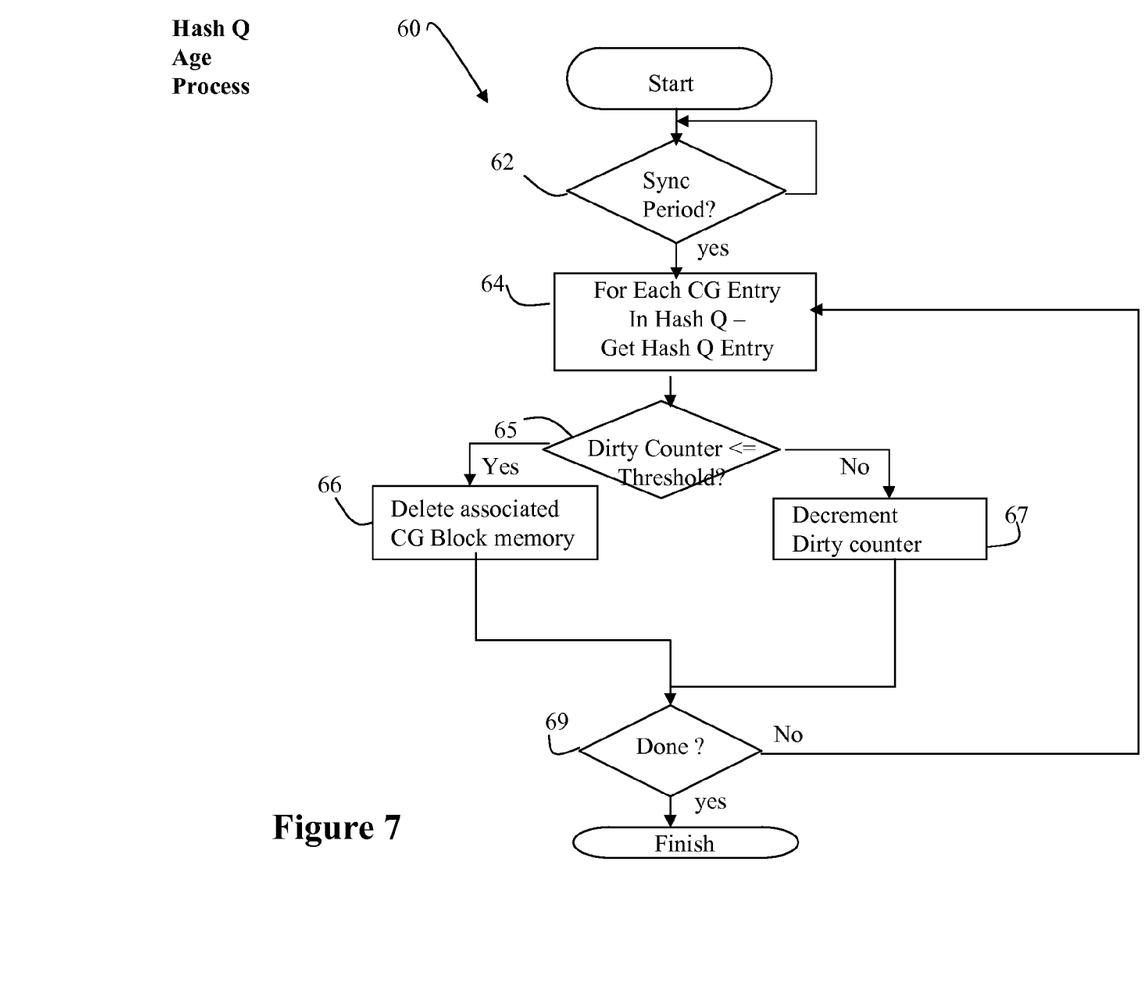
FIG. 7 is a flow diagram provided to illustrate several steps that may be performed in a cylinder group entry aging process of the present invention.

FIG. 7 is a flow diagram that illustrates exemplary steps that may be performed in a process 60 that flush CG blocks. In one embodiment, a timer initiated synch period occurs at pre-defined intervals (such as 30 seconds). At each synch interval, each CG entry is accessed and the dirty counter for the entry is evaluated, as illustrated in steps 64 and 65 in FIG. 7. If the dirty counter is determined to be less than or equal to a pre-defined threshold, then at step 66 the CG block memory corresponding to the CG entry is deleted. If the dirty counter was not less than or equal to the threshold value, then at step 67 the dirty counter is decremented. The process continues to step 69 where the next CG entry is 'aged' until all CG block entries in the global CG cache have been evaluated for currency.

Figure 8:
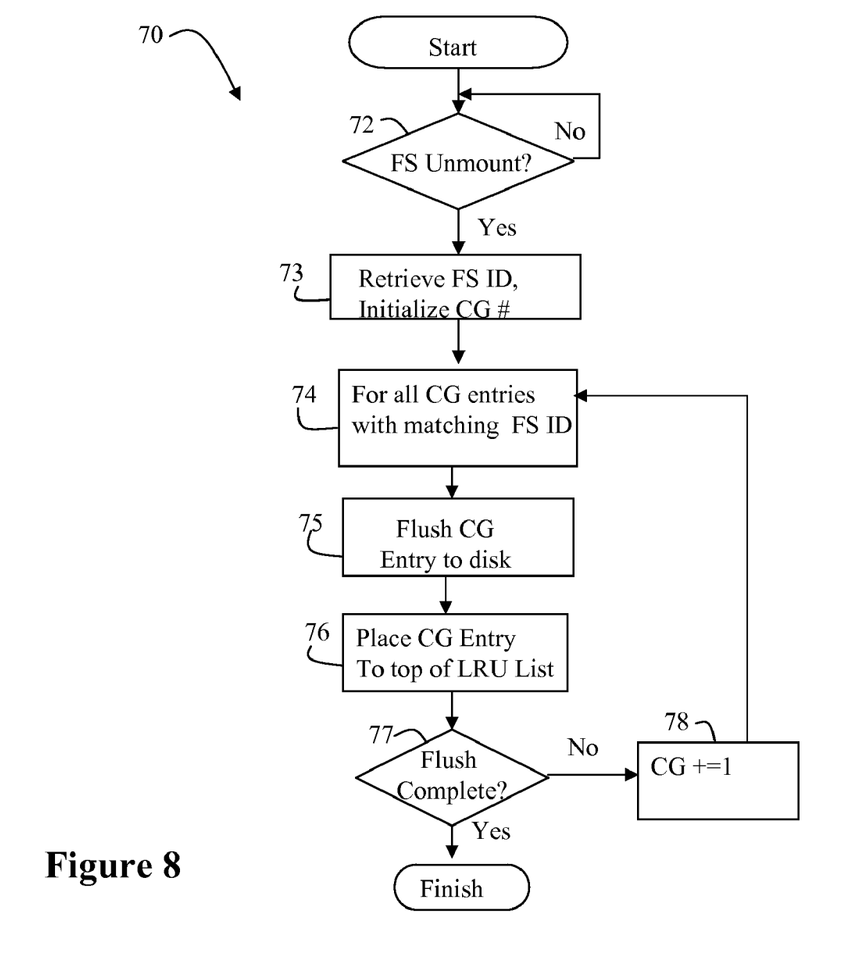
FIG. 8 is a flow diagram provided to illustrate several steps that may be performed in a cylinder group entry reclaim process of the present invention.

FIG. 8 illustrates an exemplary process that may be performed to flush entries of the global CG cache when a file system is unmounted. When it is determined at step 72 that a file system is to be unmounted, at step 73 all the CG entries corresponding to that file system are processed. The dirty CG entries associated with file system are flushed to disk. The CG state of the CG block entry is set to 'free,' and at step 76 the pointers to the CG block entries are placed at the top of list 32. The flush process continues until it is determined at step 77 that the file system flush is completed.

Figure 9:
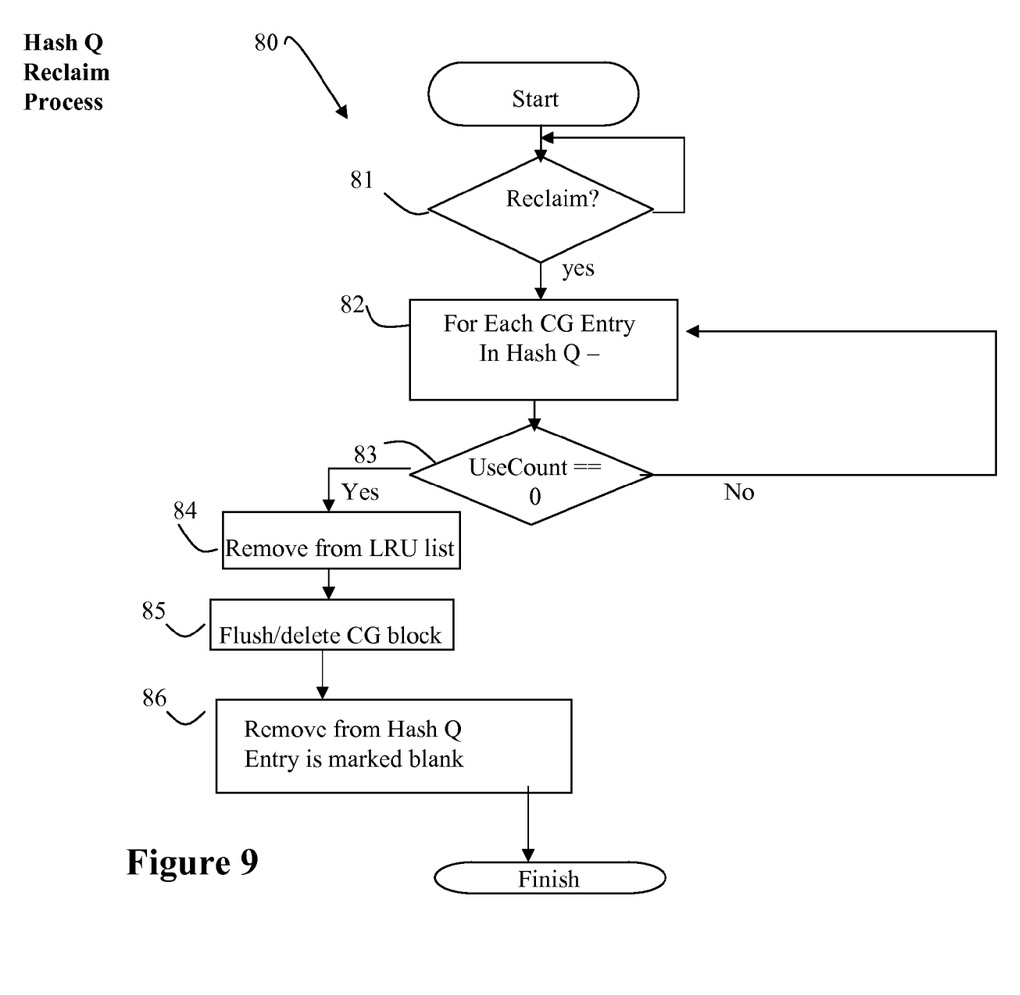
FIG. 9 is a flow diagram provided to illustrate several steps that may be performed by the cache controller of FIG. 4 to reclaim entries in the global cylinder group cache of the present invention.

Referring now to FIG. 9, when all entries are in use, one of the entry from the LRU list is re-claimed and re-used to hold the new requested CG header. As mentioned above, one method of identifying an entry to be reclaimed is described in the Bhayana application. FIG. 9 illustrates several steps in a process that reclaims blocks based on a use count.

Figure 10:
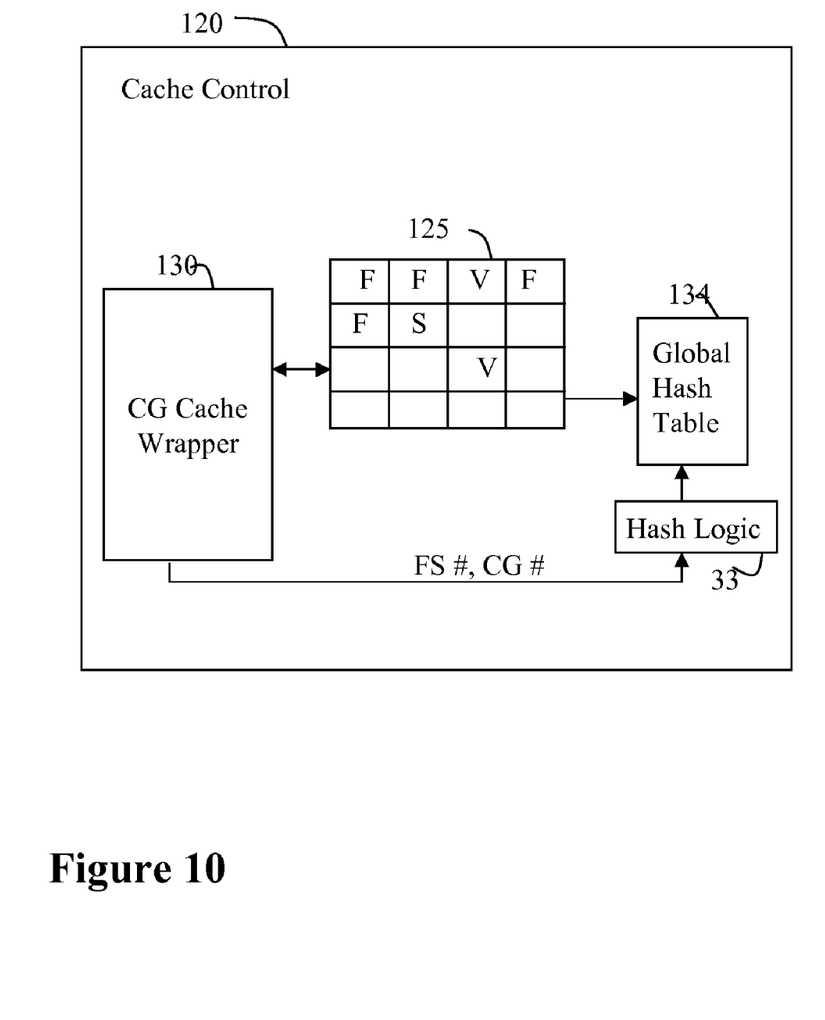
FIG. 10 illustrates an alternate embodiment of the invention which uses a bit map to identify available CG entries in the global CG cache of the present invention.

Referring now to FIG. 10, although the above has described the use of a linked list for identifying potential CG entries for allocation, the use of a linked list, ordered or unordered, is not a limitation of the present invention. For example, in an alternate embodiment a bitmap such as bitmap 125 may advantageously be used to quickly identify available CG entries for allocation to file system cylinder accesses. In such an embodiment, the bitmap may simply store a bit to indicate whether the block is available. In an alternate embodiment, the bitmap may be augmented in the manner described in the Bhayana application described above to include a link to the CG entry, to allow CG state information to be considered when determining which CG entry to select for reclamation purposes. In an alternate embodiment, CG state (such as Free, Valid, Swapped, etc.) may be included directly in the bitmap to facilitate CG block entry allocation.

Accordingly, a global CG cache that is shared by multiple file systems has been shown and described, where the global CG cache is comprised of pre-allocated buffers which are allocated to store CG block information for file system cylinders on an as-needed basis. Global CG cache entry availability may be determined using access recency information to maintain an ordered list of entries. Alternatively, availability may be tracked by maintaining a bit map of the CG block entries. Such an arrangement allows a file server to support multiple file systems using a single global CG cache without starvation and other the adverse performance impacts of the prior art. In addition, a single periodic scan of the global CG cache enables cache maintenance to be performed with only a minimal impact on file server performance.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives);

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of caching cylinder group header information includes the steps of:
    allocating space in a memory to a global cylinder group (CG) cache configured to store entries for a plurality of different file systems, the global CG cache being apportioned into a plurality of cylinder group block entries, each cylinder group block entry of the plurality of cylinder group block entries configured to be indexed using a file system identifier and a cylinder group identifier;
    receiving file system access requests from a plurality of different file systems, each file system access request including a file system identifier and a cylinder group identifier;
    selecting a CG entry for storing a cylinder block associated with the file system access; and
    accessing the CG entry using an index generated in response to the file system identifier and cylinder group identifier.

2. The method according to claim 1, wherein the step of selecting a cylinder group entry includes the step of maintaining a list of pointers to available cylinder group entries and selecting one of the cylinder group block entries from the list.

3. The method of claim 2 wherein the list is a linked list in least recently used order.

4. The method of claim 2, wherein the step of selecting a cylinder group block entry selects a least recently used cylinder group block entry from the list.

5. The method of claim 2, wherein each cylinder group entry of the global cylinder group cache stores access recency information for the associated file system cylinder.

6. The method of claim 5 wherein the access recency information comprises a counter which is initialized at cylinder access and decremented at periodic synch intervals.

7. The method of claim 1, wherein the index is generated by hashing the file system identifier and the cylinder group identifier, and wherein the step of accessing the global CG cache includes the step of mapping the pointer to the CG entry to the index.

8. A file server comprising:
    a global cylinder group (CG) cache, configured to store entries for a plurality of different file systems, the global CG cache being apportioned into a plurality of CG block entries, each cylinder group block entry of the plurality of cylinder group block entries configured to be indexed using a file system identifier and a cylinder group identifier, wherein the file server accesses a plurality of different file systems and wherein at least two of the CG block entries of the global CG cache store CG block information for at least two different file systems; and
    a processor in communication with a memory, the processor executing code for:
    receiving file system access requests from a plurality of different file systems, each file system access request including a file system identifier and a cylinder group identifier;
    selecting a CG entry for storing a cylinder block associated with the file system access; and
    accessing the CG entry using an index generated in response to the file system identifier and cylinder group identifier.

9. The file server of claim 8 further comprises means for identifying available CG block entries in the global CG cache.

10. The file server of claim 9, wherein the means for identifying includes a list of pointers to CG block entries.

11. The file server of claim 10, wherein the list is a linked list.

12. The file server of claim 9 wherein the file server further comprises means, responsive to the means for identifying, for selecting one of the CG block entries of the global CG cache in response to a file system access.

13. The file server of claim 9, wherein the means for identifying includes a bit map.

14. The file server of claim 12, further comprising:
    logic for combining a file system identifier and a cylinder group number of the file system access to obtain an index to the global CG cache.

15. The file server of claim 14, wherein the logic is hash logic.

16. The file server of claim 14 further comprising a table for mapping the index to an address of the selected CG block entry.

17. The file server of claim 8 further including global CG cache maintenance logic which analyzes access recency information associated with each CG block entry to identify potential CG block entries for reclamation.

18. The file server of claim 17, wherein the access recency information comprises a dirty counter maintained in each CG block entry.

19. The file server of claim 17 including logic for updating the access recency information at periodic intervals.

20. A non-transitory computer readable storage medium for caching cylinder group header information, the product providing instruction to a computer system for executing the steps of:
    allocating space in a memory to a global cylinder group (CG) cache configured to store entries for a plurality of different file systems, the global CG cache being apportioned into a plurality of cylinder group block entries each cylinder group block entry of the plurality of cylinder group block entries configured to be indexed using a file system identifier and a cylinder group identifier;
    receiving file system access requests from a plurality of different file systems, each file system access request including a file system identifier and a cylinder group identifier;
    selecting a CG entry for storing a cylinder block associated with the file system access; and
    accessing the CG entry using an index generated in response to the file system identifier and cylinder group identifier.

* * * * *